March 5, 1935. A. T. LIGHT 1,993,065
METHOD OF MAKING RIBBED TUBING
Filed May 8, 1934
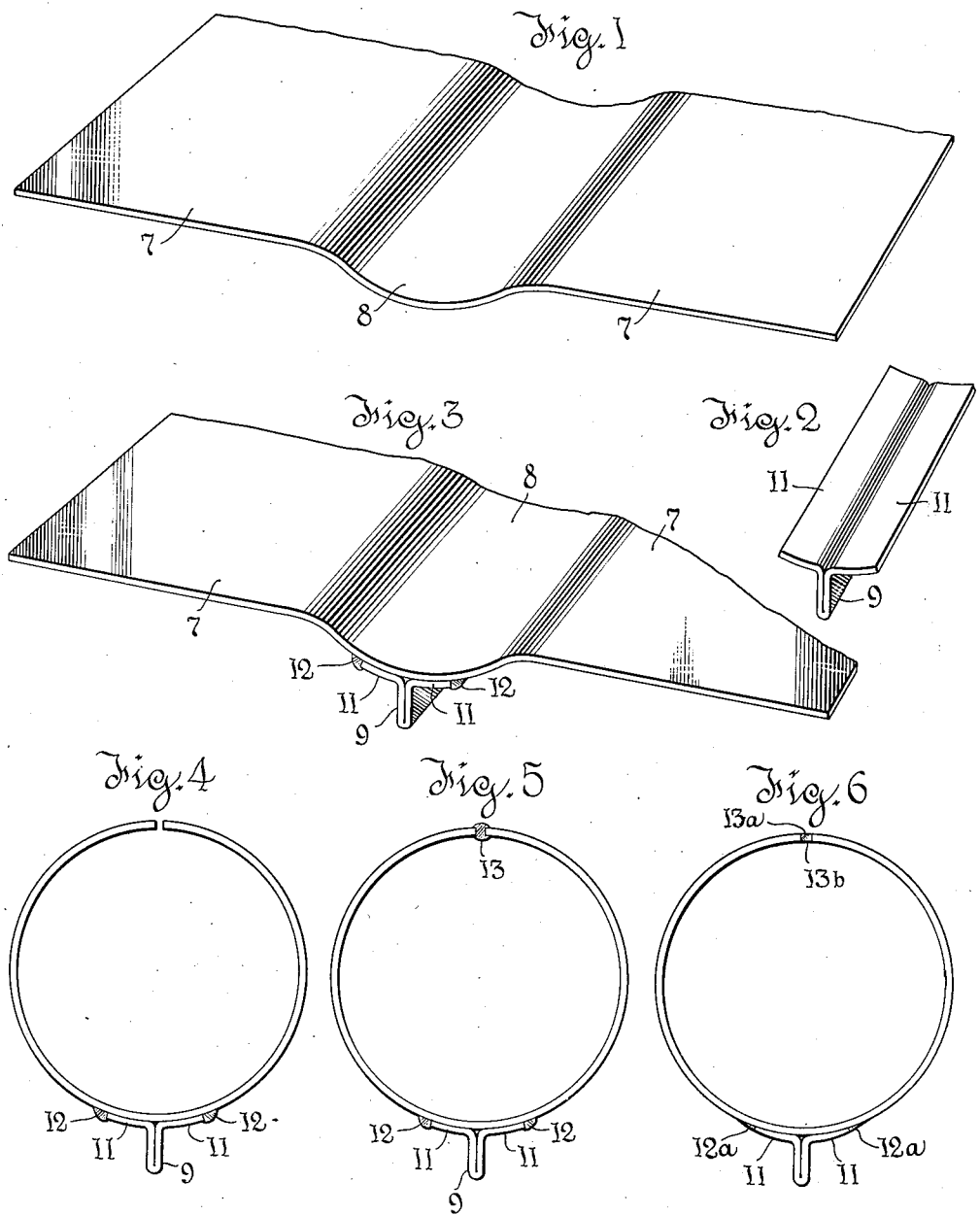
Inventor
Albert T. Light
By Dodge
Attorneys Patented Mar. 5, 1935

1,993,065

UNITED STATES PATENT OFFICE 1,993,065

METHOD OF MAKING RIBBED TUBING

Albert T. Light, York, Pa., assignor to York Ice Machinery Corporation, York, Pa., a corporation of Delaware Application May 8, 1934, Serial No. 724,626

6 Claims. (Cl. 29—157.3)

This invention relates to ribbed or flanged tubing intended for use principally in dairy appliances, such as milk coolers and the like.

In devices of this sort, the requirements of finish are particularly high. Non-corrosive metal must be used, and soldered joints are objectionable because they are subject to deterioration, particularly where severe changes in temperature are encountered. In such service, the solder begins to crack producing microscopic cavities which cannot be cleaned and which, therefore, become breeding spots for bacteria. Efforts to weld such flanges to preformed tubes have proved unsuccessful, because the high temperature used in welding permanently warps the tubes.

The present invention solves the problem by welding the flange or rib to a tube blank, the blank being curved to its final form at the point where the strip is welded. In certain classes of devices, in which there is a regenerative heat exchange, the finish at the interior of the tube must be of the same quality as the exterior finish. The present invention permits the attainment of that result also.

The preferred way of carrying out the invention will now be described in connection with the accompanying drawing, in which,—

Fig. 1 is a perspective view of a fragment of a tube blank prior to attachment of the rib.

Fig. 2 is a perspective view of a fragment of the rib blank prior to attachment to the tube blank.

Fig. 3 is a perspective view of the tube blank with the rib blank welded in place.

Fig. 4 is an end view of the blank rolled to form, but with its seam unwelded, after the rib has been welded in place.

Fig. 5 is a similar view showing the seam weld completed; and

Fig. 6 is a similar view showing the welds finished inside and outside the tube.

The first step in the formation of the tube is to prepare a long blank 7 having its middle portion bent to arcuate form, as indicated at 8. The arcuate portion 8 extends longitudinally of the blank from end to end, and is curved to the final curvature of the tube. The material of which the blank is formed is any suitable non-corrosive metal which can be welded, but preferably is a non-corrosive steel alloy.

The rib blank indicated in Fig. 2 is formed of the same material, and comprises a rib member 9, produced by folding the metal upon itself, and two outwardly extending flanges 11 which are not flat but which are curved to conform to the curvature of the portion 8 of the blank 7.

The rib blank is then attached to the tube blank 7 by two welds 12, which extend along the edges of the flange portions 11 and which are preferably formed by the use of a rotary electric welder. This stage of operation is indicated in Fig. 3.

The next step in forming the finished tube is to curve the blank 7 to the form shown in Fig. 4, after which the edges are electrically welded together, as indicated at 13 in Fig. 5. The welds 12 and 13 are then finished by a grinding operation to the smooth contours indicated in Fig. 6. The welds 12 and the edge portions of the flanges 11 are reduced by grinding to the smooth scarfed form shown at 12a in Fig. 6. The weld 13 is ground smooth at the outside, as indicated at 13a, and to the smooth contour on the inside, as indicated at 13b. In some cases it is unnecessary to grind the weld 13 inside the tube, but this operation is carried out wherever the tube is to be used in a regenerative heat exchanger, for the reason that in such exchangers the liquid flows both over and through the tube.

By following this procedure, the tendency of the finished tube to warp is greatly reduced, because the only warping tendency affecting the final form of the tube is that which is inherent in the formation of the weld 13. Since the blank is curled to form after the welds 12 are formed, and since the portion 8 is preformed to the final curvature of the tube, all internal strains are eliminated when the tube, in the process of manufacture, is brought to the state shown in Fig. 4. During the formation of the weld 13, the stiffening effect of the rib 9 and its flanges 11 seems to exercise some restraining effect on the warping tendency. However this may be, it is a fact that it is commercially practicable to produce satisfactory tubes by the method above described.

While the method has been described in considerable detail, minor departures therefrom are possible within the scope of the invention, and the description given is intended to be illustrative rather than limiting, the scope of the invention being defined in the appended claims.

What is claimed is,—

1. The method of producing tubing having a separately formed rib welded thereto, which comprises forming a sheet metal blank having a portion formed to final curvature; welding the rib to such curved portion; curving the remainder of the blank to final form with the edges juxtaposed; and welding said edges together.

2. The method of producing tubing having a separately formed flanged rib welded thereto, which comprises forming a sheet metal tube blank having a portion formed to final curvature; preparing a rib blank having a flange curved to conform to said curvature of the tube blank; welding the flange of the rib to the curved portion of the tube blank; curving the tube blank to final form with its edges juxtaposed and welding said edges together.

3. The method of forming tubing having a longitudinal rib, which comprises preparing a sheet metal tube blank having a portion curved substantially to the final curvature of the tube wall; preparing a rib blank having a flange portion curved to fit the external curvature of such curved portion of the tube blank; placing said blanks together with said curved portions in contact; welding said flanged portion to the tube blank; curving the remainder of the tube blank to form with its edges opposed to each other; and welding said edges together.

4. The method of forming tubing having a longitudinal rib, which comprises preparing a sheet metal tube blank having a portion curved substantially to the final curvature of the tube wall; preparing a rib blank having a flange portion curved to fit the external curvature of such curved portion of the tube blank; placing said blanks together with said curved portions in contact; welding said flange portion to the tube blank; curving the remainder of the tube blank to form with its edges opposed to each other; welding said edges together; and finishing said welds to afford smooth surfaces, both inside and outside the tube.

5. The method of forming tubing having a longitudinal rib which comprises, preparing a sheet metal tube blank having a portion curved substantially to the finished curvature of the tube wall; preparing a sheet metal rib blank having a rib-forming fold with marginal flanges curved to fit the curved portion of the tube blank; placing said blanks together with the curved flanges of the rib blank in contact with the curved portion of the tube blank; welding the margins of the rib blank flanges to the tube blank; curving the remainder of the tube blank to finished form with its edges juxtaposed; and welding said edges together.

6. The method of forming tubing having a longitudinal rib which comprises, preparing a sheet metal tube blank having a portion curved substantially to the finished curvature of the tube wall; preparing a sheet metal rib blank having a rib-forming fold with marginal flanges curved to fit the curved portion of the tube blank; placing said blanks together with the curved flanges of the rib blank in contact with the curved portion of the tube blank; welding the margins of the rib blank flanges to the tube blank; curving the remainder of the tube blank to finished form with its edges juxtaposed; welding said edges together; and finishing said welds to produce smooth unbroken contours.

ALBERT T. LIGHT.